Dec. 7, 1965         L. B. UPDEGROVE ETAL          3,222,211
         NOVEL PACKAGING FILMS AND PROCESSES THEREFOR
                    Filed Feb. 15, 1962
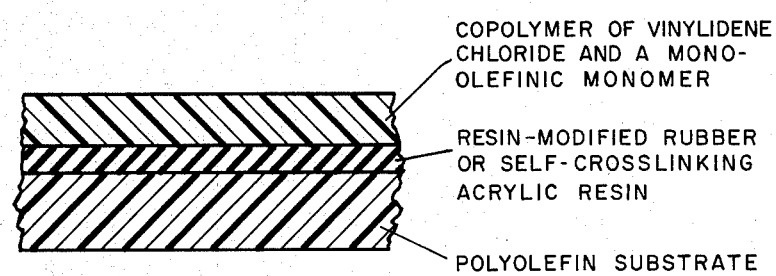
COPOLYMER OF VINYLIDENE CHLORIDE AND A MONO-OLEFINIC MONOMER
RESIN-MODIFIED RUBBER OR SELF-CROSSLINKING ACRYLIC RESIN
POLYOLEFIN SUBSTRATE
LOUIS B. UPDEGROVE
EDWIN L. MINCHER
ROBERT H. STEINER
       *INVENTORS*
BY *E. J. Berry*

3,222,211
NOVEL PACKAGING FILMS AND PROCESSES THEREFOR
Louis B. Updegrove, Fairport, Edwin L. Mincher, Ballston Lake, and Robert H. Steiner, Rochester, N.Y., assignors to National Distillers and Chemical Corporation, New York, N.Y., a corporation of Virginia
Filed Feb. 15, 1962, Ser. No. 173,364
5 Claims. (Cl. 117—76)

The present invention relates generally to improved thermoplastic sheeting material and films, and specifically to new coated polyolefin wrapping materials that are especially adapted for use in automatic wrapping and packaging machinery.

In manufacturing films from polyolefins, especially films that are to be converted into packages for foodstuffs (bread, bakery goods, candy, etc.), soft goods, pharmaceutical and surgical supplies, and the like, it is important that the film product have, among other characteristics, outstanding mechanical and optical properties. The film must be attractive, that is, it must be highly transparent, free from haze, and glossy. The film also must be strong; easily heat-sealable; resistant to blocking; stable under conditions of storage and use; and resistant to greases, gases, and vapors.

Although a few of these desired characteristics, such as high strength, high transparency and gloss, good stiffness and stability, and resistance to blocking, are relatively inherent in certain polyolefin films, certain other of the desired properties are lacking in such a film. For example, oriented polypropylene film has particularly good strength and optical properties, but it is deficient in heat sealability, that is, because of its tendency to disorientation at heat sealing temperatures, it cannot be sealed on ordinary equipment. In addition, it has relatively poor grease resistance and relatively poor resistance to gas and moisture vapor permeability.

It is an object of this invention to provide a method for imparting certain characteristics to polyolefin structures including good optical properties; resistance to permeation by grease, moisture vapor, and gases; and the ability to form peelable heat seals under a variety of sealing conditions.

It is another object of this invention to provide a heat-sealable wrapping material for foodstuffs for which a polyolefin film or sheet, either oriented or non-oriented, is the base material or substrate.

It is another object of this invention to provide coating compositions for improving the surface properties of polyolefins whereby the polyolefins can be readily employed in existing commercial wrapping and packaging machinery without major modifications to produce packages having easily opened seals.

It is another object of this invention to provide coated polyolefin structures having on at least one surface thereof a coating composition that permits heat sealability over a wide temperature range and improves the resistance of the polyolefin structure to greases, gases, and moisture vapor.

It is also an object of this invention to produce polyolefin film having a coating thereon, the coated film being especially adapted for use in automatic wrapping and packaging machinery.

Other objects and advantages of the invention will become apparent from the more detailed description presented herein below.

Among the above stated disadvantages of polyolefin film, the property of being incapable of heat sealing to form a temporary or peelable heat seal over a wide temperature range is probably the most important one insofar as usefulness as an overwrap and packaging material is concerned. The oriented polyolefin film cannot be readily heat sealed by conventional techniques because of the high degree of shrinkage exhibited by the film at its sealing temperature, which in turn is caused by a relaxation of the oriented molecules into more random arrangements. In addition to this deficiency in heat sealability, polyolefin films also have relatively poor resistance to greases and penetration of gases.

This invention consists essentially of a polyolefin film having exceptional strength, clarity, and gloss that is coated on at least one side with a very thin, heat-sealable copolymer film; packages formed therefrom; and processes for producing same. It is well known that vinylidene chloride copolymer films have excellent resistance to the passage of gases and vapors and also may be heat-sealed to give high strength seals. It has not been possible heretofore, however, to obtain good adhesion between certain vinylidene chloride latexes or solvent solutions and polyolefin film surfaces, even when the latter are treated in the conventional manner, that is, for example, by chemical treatments; by subjecting the film to a blast of hot air; flame contact treatment; high voltage electrical discharge treatment; or like processes which are well known in the art.

It has now been found that the desired vinylidene chloride copolymer coating may be attached firmly to the polyolefin film surface by use of certain selected adhesive precoat, to be defined more particularly hereinafter, as illustrated in the attached drawing.

The polyolefin film substrate of this invention is preferably formed by techniques producing film having good clarity and surface gloss. The substrate may be any suitable polyolefin, e.g., polyethylene, polypropylene, copolymers of ethylene and propylene, and other copolymers of these polyolefins. Molecularly oriented polyolefins, particularly oriented polypropylene, are preferred.

Generally, but not necessarily, the polyolefin substrate itself is in the form of a film of about 0.25 up to about 5 mils in thickness, and preferably of about 0.5 to 1.5 mils in thickness. It is to be understood, however, that films and sheeting materials of either lesser or greater thickness may be treated in accordance with the invention. The polyolefin film employed is necessarily of the type that softens or melts at temperatures sufficiently above the required sealing temperatures of the copolymer coatings such that the polyolefin base substrate does not melt or become excessively weak under the operating conditions of the automatic machinery in which the coated wrapping materials are to be employed. It is considered to be of particular advantage, in the light of current conditions prevailing in the wrapping and packaging art, to employ a base polyolefin substrate, as for instance molecularly oriented polypropylene film, which has a melting or softening point of at least 250° F.

Molecularly oriented isotactic polypropylene is produced from polypropylene which has been polymerized in such manner as to give resins having highly ordered molecular structures. After extrusion by conventional means, the hot sheet is molecularly oriented, for example, by stretching several fold in both the machine direction and the transverse direction at controlled temperatures and conditions. The effect of such orientation is to increase greatly the tensile and stiffness properties of the film. Other well-known methods of molecular orientation can be employed.

In desired, in order to insure uniform wetting of the base film by the pre-coat latex or solution, the substrate film may, before the pre-coating material is applied, be treated in any convenient manner, for example, by corona discharge.

Although the invention is particularly concerned with polyolefin film and sheeting materials, broadly speaking, the coatings disclosed herein and the processes disclosed may be used, for instance, to improve the surface characteristics, and particularly the heat sealability, of polyolefin filaments, fibers, monofils, irregular articles, and so forth.

The top coating composition of this invention should be one that (1) is capable of forming a clear, coherent film on drying at temperatures below about 250° F., (2) is capable of drying at temperatures below about 250° F. in a relatively short time (a few minutes) to give a non-tacky surface, and (3) is capable of heat-sealing at temperatures below about 275° F. when applied over a pre-coating, to be described in detail hereinafter. Suitable top coating compositions are copolymers of vinylidene chloride containing about 80 to about 97 percent of vinylidene chloride and about 3 to about 20 percent of one or more polymerizable mono-olefinic monomers copolymerizable therewith, such as an alkyl acrylate, examples of which include methyl, ethyl, butyl, isobutyl, octyl, and 2-ethylhexyl acrylates. Other possible polymerizable comonomers include methyl, ethyl, butyl, isobutyl, octyl, and 2-ethylhexyl methacrylates; phenyl methacrylate; cyclohexyl methacrylate; p-cyclohexylphenyl methacrylate; methoxyethyl methacrylate; chloroethyl methacrylate; 2-nitro-2-methylpropyl methacrylate; and the corresponding esters of acrylic acid; methyl alphachloroacrylate; octyl alpha-chloroacrylate; methyl isopropenyl ketone; acrylonitrile; methacrylonitrile; methyl vinyl ketone; vinyl chloride; vinyl acetate; vinyl propionate; vinyl chloroacetate; vinyl bromide; styrene; vinyl naphthalene; ethyl vinyl ether; N-vinyl phthalimide; N-vinyl succinimide; N-vinyl carbazole; isopropenyl acetate; acrylamide; methacrylamide or monoalkyl substitution products thereof; phenyl vinyl ketone; diethyl fumarate; diethyl maleate; methylene diethyl malonate; dichlorovinylidene fluoride; dimethyl itaconate; diethyl itaconate; dibutyl itaconate; vinyl pyridine; maleic anhydride; allyl glycidyl ether; and so forth.

The top coating composition also may contain, if desired, about 0.5 up to about 3 percent, based on the total weight of the vinylidene chloride and the mono-olefinic monomer polymerizable therewith, of an unsaturated aliphatic acid from the group consisting of acrylic acid, methacrylic acid, itaconic acid, and other such acids capable of polymerization therewith. The amount of top coating may vary over a wide range, for example from about 1.0 up to about 5.0 grams per 1000 square inches.

The pre-coating material, in addition to enhancing adhesion of the copolymer top coating to the polyolefin substrate, must also be substantially free of ageing defects, especially at moderately elevated temperatures (above 100° F.) or at high relative humidities. Two types of materials have been found to meet these requirements: (1) Resin-modified natural or synthetic rubber latexes or solvent solutions. This type of adhesive generally consists of about 50 to about 65 weight percent of rubber and about 35 to 50 percent of a so-called "tackifying" resin, for example, coumarone-indene resins, rosin derivatives, and polyterpene resins. Specific examples include butadiene-styrene-vinyl pyridine copolymer latex, carboxylic-modified butadiene-styrene copolymer latex, and butadiene-acrylonitrile copolymers. (2) Self cross-linking acrylic resin latexes, considered to be terpolymers of an alkyl acrylate, vinyl acetate, and methacrylic acid or acrylic acid, the cross-linking having been accomplished by the addition of a dibasic salt such as zinc acetate.

The amount of pre-coating material employed may vary from about 0.10 up to about 8.0 grams per 1000 square inches. Since, however, the pre-coating material does not contribute significantly to the barrier properties of the ultimate product, in practice the weight of the pre-coating composition is kept to the minimum amount required to give satisfactory adhesion of the substrate to the coating.

In general, both the pre-coating composition and the coating materials are employed in the form of latexes or solvent solutions, and each is applied in any convenient and known manner, such as by dipping, spraying, brushing, roll coating, gravure coating, and so forth, preferably at a temperature of about 60° to 100° F. The excess material may be removed by squeeze rolls, doctor knives, etc. In practice, generally the pre-coating is applied to the substrate; the pre-coated film is dried, for example, by hot air, radiant heat, or other convenient means; the top coating is then applied; and the coated film is again dried by any convenient means. The resulting coated polyolefin substrate is attractive; strong; heat-sealable; and resistant to greases, gases, and moisture vapor. It is thus particularly suitable for use as a wrapping material or film, capable of being used in presently-existing automatic package wrapping machinery, such as the automatic wrapping machines presently employed for wrapping products in cellophane. Packages produced from this film are strong, glossy, and appealing to the eye; they can be opened readily by peeling the sealed layers of film apart.

The products contemplated as being especially suited and well-adapted for packaging and for which the sheeting material of this invention is particularly suited for use include such items and products as bread, bakery products, crackers, candy, nuts, potato chips, cigarettes, tobacco, boxed products, candles, and the like.

For all items of food packaging, it is also necessary that the copolymer top coatings, pre-coatings, and other components contained in said coatings be non-toxic and essentially odor-free.

The commercial wrapping and packaging machines envisioned for use with this novel flexible wrapping material and for which the hereindescribed coated polyolefin film is especially adapted may comprise a variety of such machines in use in commercial practice. The designs of these machines may vary in mechanical detail, but their functions may be described as follows:

In general, the product to be packaged is fed, for instance, by automatic conveyor as by a belt into one section of the apparatus, and simultaneously the film roll packaging stock is fed and cut to proper size or previously cut film sections are automatically folded around said product to encase it therein. The folds and/or overlaps are held in place by mechanical means, and the encased or wrapped product is then conveyed over, passed adjacent to or under heated platens to effect heat seal of the folds and/or overlaps.

In order to operate efficienctly in such equipment, it is necessary that the flexible sheeting or wrapping material be capable of forming a heat seal at temperatures capable of attainment by the heated platens. In commercial use, the temperature of the platens can be varied over relatively wide limits, e.g., about 200° to 500° F.

It is contemplated in the broad aspects of the invention disclosed herein that the coating compositions, including the pre-coat, for polyolefin structures and the process of applying such coating compositions to polyolefin surfaces, including without limitation film, sheeting, and the like, are novel. It is also contemplated that the coated polyolefin structures themselves are novel, as well as the heat-sealed containers, structures, and packages formed therefrom, either with or without the encasement of the product therein.

While there are disclosed below but a limited number of embodiments of the invention herein presented, it is possible to produce still other embodiments without departing from the inventive concept herein disclosed. It is desired therefore that only such limitations be imposed on the appended claims as are stated therein.

EXAMPLE I

Polypropylene film which had been molecularly oriented in two directions was electrically treated. Film ranging in gauge from about 0.5 to 0.9 mil was coated on one side, using a gravure roll technique followed by counter-rotating smoothing bars, with a pre-coating. The pre-coated film was then passed through a drying oven heated by radiant-convection heaters so that the film temperature did not exceed 250° F. The film was then coated on the same side with a vinylidene chloride copolymer latex (National Starch and Chemical Co.'s Resyn 3600) top coating in a second gravure station, and the thus-coated film was passed through a drying oven as in the first coating step.

EXAMPLE II

Typical pre-coating materials were studied, and test results obtained are indicated in the following table. In each case the vinylidene chloride copolymer top coating was a copolymer of 90 percent of vinylidene chloride and 10 percent of ethyl acrylate.

*Table*

| Run No. | Pre-Coat Composition | Weight [1] | Top-Coat Weight [1] | Machine Direction Heat Seal Strengths, grams per inch | | |
|---|---|---|---|---|---|---|
| | | | | Initial | Film [2] | Packages [3] |
| 1 | Self cross-linking acrylate copolymer latex (National Starch's Resyn 78-3158). | 0.7 | 4.0 | 93 | 95 | 95 |
| 2 | Resin-modified natural rubber latex (Arabol Co.'s Arabol E-1176-B). | 0.7 | 7.0 | 144 | 114 | 100 |
| 3 | Resin-modified natural rubber solution (Swift's Z-7139). | 0.7 | 6.0 | 127 | 130 | 100 |
| 4 | Acrylate copolymer latex (Rohm & Haas' Rhoplex B-10). | 0.7 | 2.3 | 74 | 65 | 16 |
| 5 | Acrylate copolymer latex (Rohm & Haas' Rhoplex B-10). | 0.7 | 7.0 | 128 | 95 | 20 |
| 6 | Polyacrylic latex (Goodrich's Hycar 2600 X-67). | 0.7 | 2.3 | 75 | 87 | 15 |
| 7 | Polyacrylic latex (Goodrich's Hycar 2600 X-1). | 0.7 | 7.0 | 181 | 148 | 35 |

[1] Grams/1,000 sq. in./side.
[2] Aged 7 days at 122° F. and 10% relative humidity before sealing.
[3] Aged 5 days at 75% relative humidity.

It can be seen from the tabulated data that the pre-coating materials of this invention, as shown in Runs 1, 2, and 3, are superior for the purposes of this invention to the types disclosed in the prior art, such as acrylates copolymer latexes and polyacrylic latexes, as shown in comparative Runs 4, 5, 6, and 7.

For the purposes of this invention, there is required a film which will have heat seal strengths of at least 70 grams per inch and which will retain this seal strength level after aging of either the roll film or the sealed package at either elevated temperature or at relatively high humidities.

Thus, as seen in the table, Runs 1, 2, and 3 are satisfactory in both dry heat aging and in relative humidity properties. Comparative Runs 5, 6, and 7 indicate satisfactory dry heat aging but poor humidity resistance, and Run 4 fails in both dry heat aging and humidity resistance.

EXAMPLE III

The procedure of Example I was repeated, except that the top coat was Dewey & Almy's Daran 202, a vinylidene chloride copolymer latex. The results were comparable.

EXAMPLE IV

The procedure of Example I was repeated, except that the top coat was Interchemical Corp.'s Vylan 12, a vinylidene chloride copolymer latex. Comparable results were achieved.

EXAMPLE V

Molecularly oriented polypropylene film was coated by the process of Example I, using a resin-modified natural rubber latex (Arabol Co.'s Arabol E-1176-B) as the pre-coat and a 90 percent vinylidene chloride-10 percent ethyl acrylate copolymer (National Starch and Chemical Co.'s Resyn 3600) as the top coat. The dried coated film was then wound into rolls and slit into suitable widths for use as a wrapping film.

A roll of this coated film was then affixed in a Hudson Sharp wrapping machine and used to wrap individual packs of crackers. The temperatures of the various platens of the machine were controlled such that secure but "peelable" seals were formed from the coated film to produce wrapped packages containing the product. About 300 packages per minute were wrapped continuously in this manner.

The resulting packages were clear; transparent; strong; glossy; and resistant to greases, gases, and moisture vapor.

What is claimed is:

1. A wrapping film comprising essentially a polyolefin substrate pre-coated on at least one side with a composition selected from the group consisting of a resin-modified rubber and a self-crosslinked acrylic resin and thereafter coated with a top coating composition comprising a copolymer obtained from polymerization of about 80 to 97 percent of vinylidene chloride and about 3 to 20 percent of a polymerizable mono-olefinic monomer copolymerizable therewith.

2. The film of claim 1 wherein the polyolefin substrate is molecularly oriented polypropylene film.

3. The film of claim 1 wherein the polymerizable mono-olefinic monomer is an alkyl acrylate.

4. The film of claim 5 wherein the alkyl acrylate is ethyl acrylate.

5. A wrapping material comprising substantially isotactic polypropylene film which has been molecularly oriented, a pre-coating on at least one side of said polypropylene film selected from the group consisting of a resin-modified rubber and a self-crosslinked acrylic resin, and a top coating comprising a copolymer obtained from polymerization of about 80 to 97 percent of vinylidene chloride, about 3 to 20 percent of an alkyl acrylate, and about 0.5 to 3 percent, based on the total weight of the previous components, of an unsaturated aliphatic acid selected from the group consisting of acrylic acid, methacrylic acid, and itaconic acid.

References Cited by the Examiner

UNITED STATES PATENTS

| 3,018,197 | 1/1962 | Covington et al. | 117—161 |
| 3,031,332 | 4/1962 | Rothacker | 117—138.8 |
| 3,075,857 | 1/1963 | Fior et al. | 117—138.8 |
| 3,079,278 | 2/1963 | Naudain | 117—138.8 |
| 3,101,292 | 8/1963 | Kine et al. | 117—161 |
| 3,128,200 | 4/1964 | Park et al. | 117—72 |

FOREIGN PATENTS 632,167  12/1961  Canada.

RICHARD D. NEVIUS, *Primary Examiner.*